I. J. REUTER.
SYSTEM FOR SUPPLYING ELECTRICITY.
APPLICATION FILED OCT. 19, 1912.

1,169,866.

Patented Feb. 1, 1916.

Witnesses.
E. B. Gilchrist
L. J. Porter

Inventor.
Irving J. Reuter
by
Thurston & Kwis
Attys

UNITED STATES PATENT OFFICE.

IRVING J. REUTER, OF ANDERSON, INDIANA, ASSIGNOR TO REMY ELECTRIC CO., OF ANDERSON, INDIANA.

SYSTEM FOR SUPPLYING ELECTRICITY.

1,169,866. Specification of Letters Patent. Patented Feb. 1, 1916.

Application filed October 19, 1912. Serial No. 726,710.

*To all whom it may concern:*

Be it known that I, IRVING J. REUTER, a citizen of the United States, residing at Anderson, in the county of Madison and State of Indiana, have invented a new and useful System for Supplying Electricity, of which the following is a specification.

The object of this invention is to produce a system for supplying electricity which is adapted for use in the ignition and lighting of automobiles propelled by internal combustion engines, although it may be used in other situations.

The invention relates particularly to the generator.

In the electric supply systems employed for automobiles, use is frequently made of a storage battery connected in parallel with a generator and electric lamps.

Owing to the confined situation in which the generator may be located, it is desirable that it be as small as possible. In order to be adapted to various speeds of driving, it should be capable of delivering a large output at low speed, and this output should not vary greatly as the speed is increased. Simplicity is also essential to reduce the liability of derangement.

It may also be desirable that the output of the generator be greater when the lights, etc., are in operation. Where the electric supply system delivers current to ignition apparatus, it is desirable that the voltage supplied to the ignition apparatus increase with increasing speed, due to the shorter interval that the timer contacts remain closed and permit the voltage applied to the ignition coil to act against the self induction of the said coil.

The apparatus forming the subject matter of the present invention has all the desirable features or characteristics above enumerated.

Figure 1:
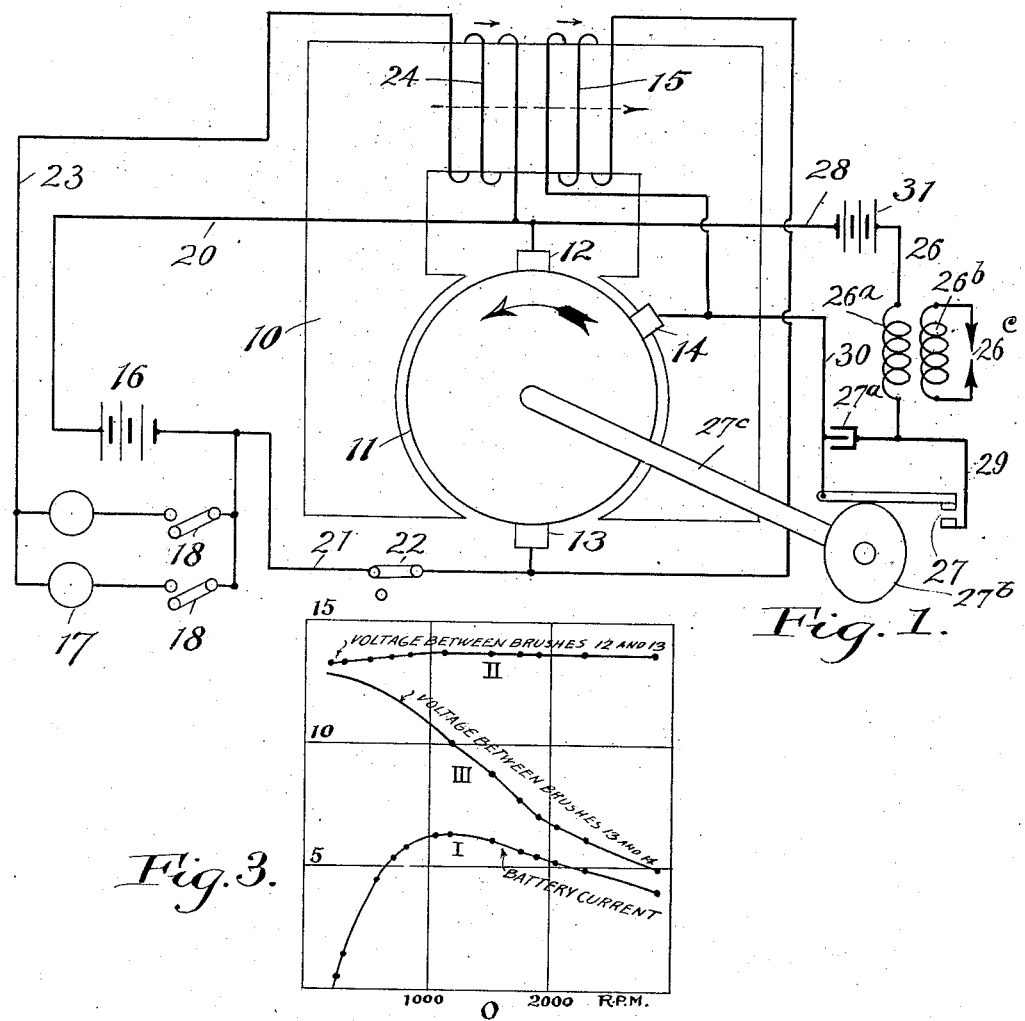
Figure 3:
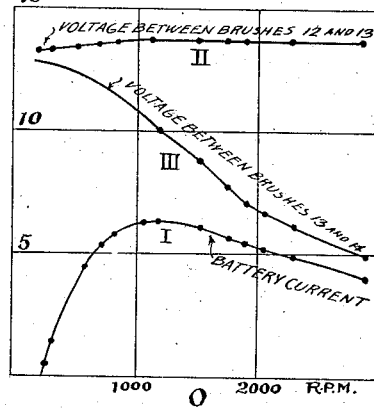
Figure 2:
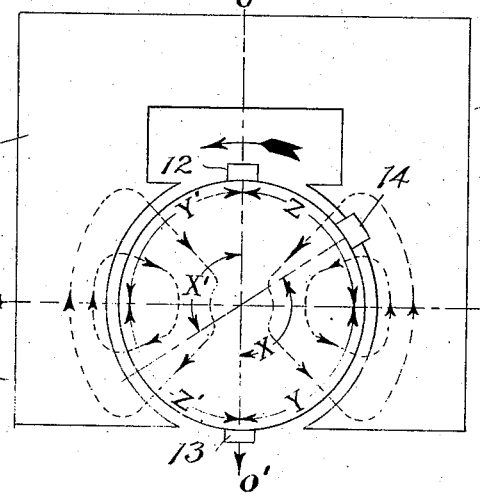

In the drawings, Figure 1 is a diagrammatic view of a lighting, battery charging, and ignition system embodying my invention; Fig. 2 is a diagrammatic view of the generator showing particularly the magnetic paths or circuits; and Fig. 3 shows the current and voltage curves obtained experimentally from a machine embodying my invention.

In Fig. 1, 10 represents the field magnet of the generator which for convenience of illustration and description, is shown as a two-pole machine, and 11 represents conventionally the commutator against which bear three brushes 12, 13 and 14. The brushes 12 and 13 hereinafter termed the load brushes correspond to those ordinarily employed in direct current generators and are preferably located at or near the neutral points or plane,—that is, where the voltage generated between adjacent commutator bars is zero. The brush 14 is an additional or auxiliary brush which may be termed the field brush, and is located preferably away from the neutral point, and is displaced from brush 12 in the direction opposed to the direction of rotation. The brushes are normally fixed. That is to say, their positions are not changed during the operation of the system, but they are preferably adjustable so that they may be located where the best conditions of operation are obtained.

The field magnet 10 is provided with a field winding 15 for excitation and regulation, one terminal of the winding being connected to brush 13 and the other to brush 14.

The generator is adapted to supply current to a storage battery 16, and to lamps 17 which may be cut into or out of service at will by switches 18. One terminal of battery 16 is connected by conductor 20 to load brush 12, while the other battery terminal is connected by conductor 21 to the opposite load brush 13. Included in the generator-battery circuit, and in this case in conductor 21 is a switch 22 which is opened when the generator is idle or when it is driven at such a low speed that its voltage is less than the voltage of the battery, said switch being preferably one of the well known automatic types.

One terminal of each of the lamps is connected through one of the switches 18 to conductor 21, and the other terminals of the lamps are connected by conductor 23 to load brush 12. Between the lamps and load brush 12 is an auxiliary field winding 24, which is in series with the lamps, and when the lamps are in use, is adapted to produce a field to augment the field produced by winding 15, as will be hereinafter explained.

The ignition system which is adapted to be supplied with current from the generator, or from the generator and a battery, includes an induction coil 26, composed of a primary 26ª, and a secondary 26ᵇ connected to a spark plug 26ᶜ, a circuit breaker 27 in the primary circuit, and a condenser 27² bridging the contacts of the circuit breaker in the well known manner. The circuit breaker is adapted to be operated by a cam 27ᵇ which may be rotated by the generator through suitable driving mechanism such as a shaft 27ᶜ. It will be observed that the primary of the coil 26 is connected to generator brushes 12 and 14 in the following manner. One terminal of the primary 26ª is connected by conductor 28 to brush 12, while the other terminal of the primary is connected by conductor 29 to one contact of the circuit breaker whose other contact or terminal is connected by conductor 30 to generator brush 14. It will be seen that there is included in the primary circuit, and in this case in conductor 28 between brush 12 and primary 26ª, a battery 31 which while not in all cases essential, is preferably employed.

By connecting the field winding 15 between load brush 13 and auxiliary brush 14, and by connecting the terminals of the primary coil of the ignition circuit between load brush 12 and auxiliary brush 14, the voltage at the terminals of the load circuit remains practically constant by reason of the characteristic of the storage battery, and the current in the load circuit does not vary materially as the speed increases, but at the same time, the voltage impressed by the generator on the primary of the ignition circuit rises rapidly as the speed increases.

The phenomena above stated will be apparent from a consideration of the action of the flux due to the armature reaction or the so-called "cross flux," and the characteristics of the storage battery which is connected to load brushes. In Fig. 2, M—M' indicates the axis of the main flux created by the current in field coil 15, or in field coils 15 and 24, and O—O' indicates the axis of the cross flux, whose paths through the armature and field poles are roughly indicated by the dotted lines. In this same figure, the positions of the brushes and direction of rotation are also shown. Inasmuch as this cross flux opposes the main flux in the regions Y and Y' and assists the main flux in the regions Z and Z', and as the field distortion due to the cross flux increases with the speed, it follows that the voltage between brushes 13 and 14 which depends on the flux in the region X and X' decreases with the speed, and that the voltage between brushes 12 and 14 increases with the speed. The voltage across the load brushes 12 and 13 is unaffected by the cross flux and is substantially constant due chiefly to the storage battery in the load circuit and to the fact that the field created by the current in coil 15 is weakened when the speed increases and is strengthened when the speed decreases. In consequence, the coil 15 whose terminals are connected to the brushes 13 and 14, (across which the voltage decreases with the speed) functions as an exciting and regulating coil, so as to cause the machine to have a current output which does not vary materially with change of speed.

In Fig. 3, I have shown actual current and voltage curves of a machine embodying my invention. In this figure, wherein the horizontal axis represents revolutions per minute, and the vertical axis either volts or amperes, curve I shows the relation between the speed in revoultions per minute and the current delivered to the battery; curve II represents the voltage between the load brushes 12 and 13; and curve III represents the voltage between brushes 13 and 14 between which the exciting and regulating coil 15 is connected. Curve I shows that the current reaches its maximum value at a comparatively low speed, and varies only slightly as the speed is increased, the curve having a slight drooping characteristic. Curve II shows that the voltage between the load brushes remains practically constant, and curve III shows that the voltage between brushes 13 and 14 decreases rapidly from its maximum value as the speed is increased.

The voltage across brushes 12 and 14, at any particular speed, is the difference between that across 12 and 13, and that across brushes 13 and 14. But that across 12 and 13 is substantially constant, and that across 13 and 14 decreases with increasing speed, as was shown in the explanation of the regulation, and as is apparent from the voltage curves here shown. Therefore, the voltage across brushes 12 and 14 which rapidly increases with increasing speed, is enabled to effectively augment the battery 31, so that as the increasing speed of the circuit breaker cam reduces the time during which the circuit breaker is closed, the voltage acting against the inductance of the winding 26ª is increased, resulting in good sparks at the spark plug 27, at both high and low speeds.

Unless it is desired to operate the ignition system at low speeds, the battery 31 is not absolutely necessary, as the ignition circuit may be operated by means of the voltage between brushes 12 and 14 alone. In other words, the generator serves as a substantially constant current and voltage machine, as far as the main load circuit is concerned, and otherwise functions in a desirable manner for battery charging and lighting purposes, and it serves as a source of current whose voltage increases with the speed. This increase in voltage compensates for the reduction in the time available for magnetizing the core of the induction coil, permitting good sparks to be obtained at high speed as well as at low speeds.

The regulation occurring when the lamps 17 are turned off is like the regulation previously described, but when the lamps are on, the current passing between the generator and the lamps is obliged to pass through the winding 24, thereby increasing the main flux and the output of the machine. The action of this additional winding may be explained as follows: Assume the generator running at a given speed, with the lamps 17 turned off; if then the lamps be turned on, the main flux is increased by the additional ampere turns due to the winding 24, which tends to increase the E. M. F. between the brushes 12 and 13, resulting in an increase of current output. This increase of current is controlled and limited by the increase of cross flux and the resulting reduction of current in the winding 15, as explained fully in the preceding part of the description.

Having thus described my invention, what I claim is:

1. A current generating and ignition system comprising a generator having means for regulating the current output as the speed varies and having a pair of brushes between which the voltage increases as the speed increases, and an ignition circuit connected to said brushes.

2. In a system for supplying electricity, a generator having a plurality of brushes, a load circuit connected to two of the brushes, the voltage between said two brushes being substantially constant at varying speed, an ignition circuit connected to two of the brushes, the voltage between said last named brushes increasing with the speed.

3. In a current generating and ignition system, a generator having a pair of main brushes, the voltage between which is substantially constant at varying speeds and having a third brush displaced from one of said load brushes, the voltage between said third brush and said last mentioned load brush increasing with the speed, and an ignition circuit connected to said last mentioned brushes.

4. In a battery charging and ignition system, a generator having a plurality of brushes including a pair of load brushes and a third brush displaced from one of said load brushes, a load circuit connected to said load brushes, a current regulating field coil connected to said auxiliary brush and one of said load brushes, and an ignition circuit connected to said third brush and the other of said load brushes.

5. In a system for supplying electricity, a generator having means for regulating the current output as the speed varies including a current regulating field winding, and provided with three brushes, the voltage between two of which decreases with the speed, and the voltage between two of which increases with the speed, said field winding being connected to said first named pair of brushes, and an ignition circuit connected to said second named pair of brushes.

6. In a current generating and ignition system, a generator having a current regulating field coil, and provided with three brushes including two load brushes, the voltage between which is substantially constant at different speeds, and a third brush displaced from neutral position in a direction opposite to the direction of rotation so that the voltage between said brush and the load brush displaced therefrom in the direction of rotation increases with the speed and the voltage between said brush and the brush displaced therefrom in the direction opposite to the direction of rotation decreases with the speed, an ignition circuit having terminals connected to the said brushes between which there is an increase of voltage with increase of speed, and said field winding being connected to said brushes between which there is a decrease of voltage with increase of speed.

7. In a battery charging and ignition system, a generator having a pair of load brushes and a third brush displaced from one of said load brushes and between which and said load brush there is a difference of potential which varies with the speed, and an ignition system including an induction coil having a primary circuit, an interrupter and a battery for said circuit, said circuit being connected to said two brushes between which there is a difference of potential varying with the speed.

IRVING J. REUTER.

Witnesses:
F. P. McDermott, Jr.,
V. G. Painter.